United States Patent
Trevathan et al.

(10) Patent No.: US 10,116,642 B2
(45) Date of Patent: Oct. 30, 2018

(54) IDENTITY MANAGEMENT OVER MULTIPLE IDENTITY PROVIDERS

(71) Applicant: Kony, Inc., Orlando, FL (US)

(72) Inventors: Matthew B. Trevathan, Roswell, GA (US); Perraju Bendapudi, Hyderabad (IN); Deepak Chanderasakar, Fremont, CA (US); Bjorn Hildahl, Orlando, FL (US); Gopi Krishna Mudumbai, Hyderabad (IN); Krishna Padmasola, Hyderabad (IN); Jagan Peri, Hyderabad (IN); Sri Ramanathan, Lutz, FL (US); Matthew A. Terry, Celebration, FL (US)

(73) Assignee: KONY, INC., Orlando, FL (US)

( * ) Notice: Subject to any disclaimer, the term of this patent is extended or adjusted under 35 U.S.C. 154(b) by 0 days.

(21) Appl. No.: 15/619,716

(22) Filed: Jun. 12, 2017

(65) Prior Publication Data

US 2017/0279793 A1    Sep. 28, 2017

Related U.S. Application Data

(63) Continuation of application No. 14/875,117, filed on Oct. 5, 2015, now Pat. No. 9,712,513.

(51) Int. Cl.
*H04L 29/06* (2006.01)
*G06F 17/30* (2006.01)

(52) U.S. Cl.
CPC .... *H04L 63/0807* (2013.01); *G06F 17/30917* (2013.01); *H04L 63/06* (2013.01)

(58) Field of Classification Search
CPC .................................................... H04L 63/06
See application file for complete search history.

(56) References Cited

U.S. PATENT DOCUMENTS

| | | | |
|---|---|---|---|
| 9,332,480 B2* | 5/2016 | Griot | H04W 40/04 |
| 2011/0246438 A1* | 10/2011 | Sathish | G06F 17/30873 |
| | | | 707/706 |
| 2012/0030248 A1* | 2/2012 | Blinnikka | G06F 17/30902 |
| | | | 707/803 |
| 2012/0088487 A1* | 4/2012 | Khan | H04W 4/001 |
| | | | 455/418 |
| 2012/0330869 A1* | 12/2012 | Durham | G06N 5/022 |
| | | | 706/16 |
| 2013/0150000 A1* | 6/2013 | Wong | H04W 12/06 |
| | | | 455/411 |
| 2013/0204838 A1* | 8/2013 | Gould | H04L 41/5041 |
| | | | 707/609 |
| 2013/0219297 A1* | 8/2013 | Soundararajan | G06F 8/38 |
| | | | 715/752 |
| 2014/0189808 A1* | 7/2014 | Mahaffey | H04L 63/0853 |
| | | | 726/4 |

(Continued)

*Primary Examiner* — Ali Shayanfar
(74) *Attorney, Agent, or Firm* — Andrew M. Calderon; Roberts Mlotkowski Safran Cole & Calderon, P.C.

(57) ABSTRACT

Systems and processes of advanced identity management over multiple identity providers deployable through mobile applications are provided. The process, e.g., method, includes requesting a backend service from multiple backend services by a requesting device. The method further includes exposing the requested backend service though a call in by a gateway service using a token mapped to the requested backend service, without exposing any of the backend services directly to the requesting device.

17 Claims, 5 Drawing Sheets

(56) References Cited

U.S. PATENT DOCUMENTS

| | | | |
|---|---|---|---|
| 2015/0006732 A1* | 1/2015 | Schmidt | H04L 47/726 709/226 |
| 2015/0026236 A1* | 1/2015 | Solter | H04L 63/0892 709/203 |
| 2015/0089637 A1* | 3/2015 | Centonze | G06F 21/57 726/21 |
| 2015/0089673 A1* | 3/2015 | Beckman | H04L 63/105 726/29 |
| 2015/0106517 A1* | 4/2015 | Saunders | H04L 63/0428 709/225 |
| 2015/0381700 A1* | 12/2015 | Zhang | H04L 67/02 709/219 |
| 2016/0021064 A1* | 1/2016 | Lock | H04L 63/0428 726/26 |
| 2016/0088023 A1* | 3/2016 | Handa | G06F 17/30899 726/1 |
| 2016/0134616 A1* | 5/2016 | Koushik | H04L 63/0807 726/9 |
| 2016/0301739 A1* | 10/2016 | Thompson | G06F 9/541 |

* cited by examiner

IDENTITY MANAGEMENT OVER MULTIPLE IDENTITY PROVIDERS

FIELD OF THE INVENTION

The invention relates to identity management for exposing backend services to mobile devices and, more particularly, to systems and processes of advanced identity management over multiple identity providers deployable through mobile applications.

BACKGROUND OF THE INVENTION

Simple mobile solutions that opened the mobile market used a single identity provider for authenticating an individual or device. This is due to the fact that users carried a specific function with their mobile application, such as expense reporting that only required the user to authenticate against a single identity provider. This method works for single identities since the token that is provided by the identity provider can easily be mapped to the service. In this case, the developer understands exactly how to submit credentials from the identity provider to the service during each call.

As applications have evolved with the advent of social media and cloud computing, developers have to now contend with both internal identities as well as external identities to gather data and create responses for the end user. This creates complex identity management problems since the developer needs to keep track of what services match which identity, as well as how the identity maps to the backend service. Also, when multiple identities are used, developers are forced to keep track of all the tokens as well as programmatically map these tokens to each of the services they want to use. In such case, the device may need several different identities.

Some of the tokens from these identities could be passed in the header, some tokens could be passed in the URL as well as some identity providers may send multiple tokens back to the developer. It would be the developer's responsibility to understand how all these tokens map back to a service. However, this presents many problems including:

(i) the user must keep up with all the tokens for each provider;

(ii) some services may take a specific subset of tokens as part of the service, and it is then up to the developer to map the tokens from an identity provider to the service properly using code;

(iii) the developer must code the identity mapping into each service call, which requires the user to understand which identities themselves map to which service; and (iv) if the service changes, the developer must remap all these services in their code with their respective identities, which becomes problematic when the user may be using similar services across multiple applications.

Further, there is increased interest in an emerging field called TOT (the Internet of Things). In this domain, millions of connected entities including sensors for a variety of domestic uses (e.g., monitoring a home's temperature and humidity), industrial uses (e.g., monitoring the environmental conditions of a chemical process), and personal uses (e.g., devices monitoring our health and other parameters such as wearables) are rapidly being discovered every day. As such, the whole domain of providing identity and access management services is not just about computers, phones and tablets anymore; it now includes providing a foundational underpinning that is able to provide these services for a new vast class of intermittently connected devices across the ecosystem that will soon be proliferating in the billions in the next few years.

SUMMARY OF THE INVENTION

In a first aspect of the invention, a method comprises requesting a backend service from multiple backend services by a requesting device. The method further comprises exposing the requested backend service though a call in by a gateway service using a token mapped to the requested backend service, without exposing any of the backend services directly to the requesting device.

In another aspect of the invention, a computer program product comprises a computer readable storage medium having program instructions embodied therewith. The computer readable storage medium is not a transitory signal per se, and the program instructions are readable by a computing device to cause the computing device to perform a method comprising: mapping tokens to parameters in a service call to a requested backend service; making the service call to a requested backend service, from a service provider; exposing the requested backend service only to the service provider; and providing a service of the requested backend service to a device, directly from the the service provider while not exposing the backend service to the device.

In yet another aspect of the invention, a system comprises a CPU, a computer readable memory and a computer readable storage medium, and program instructions to: enter usernames and passwords for systems on a device during a registration process; to call an identity management platform to create an identity vault using the username and password supplied by the device; to create a cryptographic hash of the username and password submitted during initial registration as a key to the vault; to send the key back to the device which uses the key and a valid identity token on future access to the vault to update, delete or create new credentials for the vault; and to map the credentials in the vault by name to a backend service. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
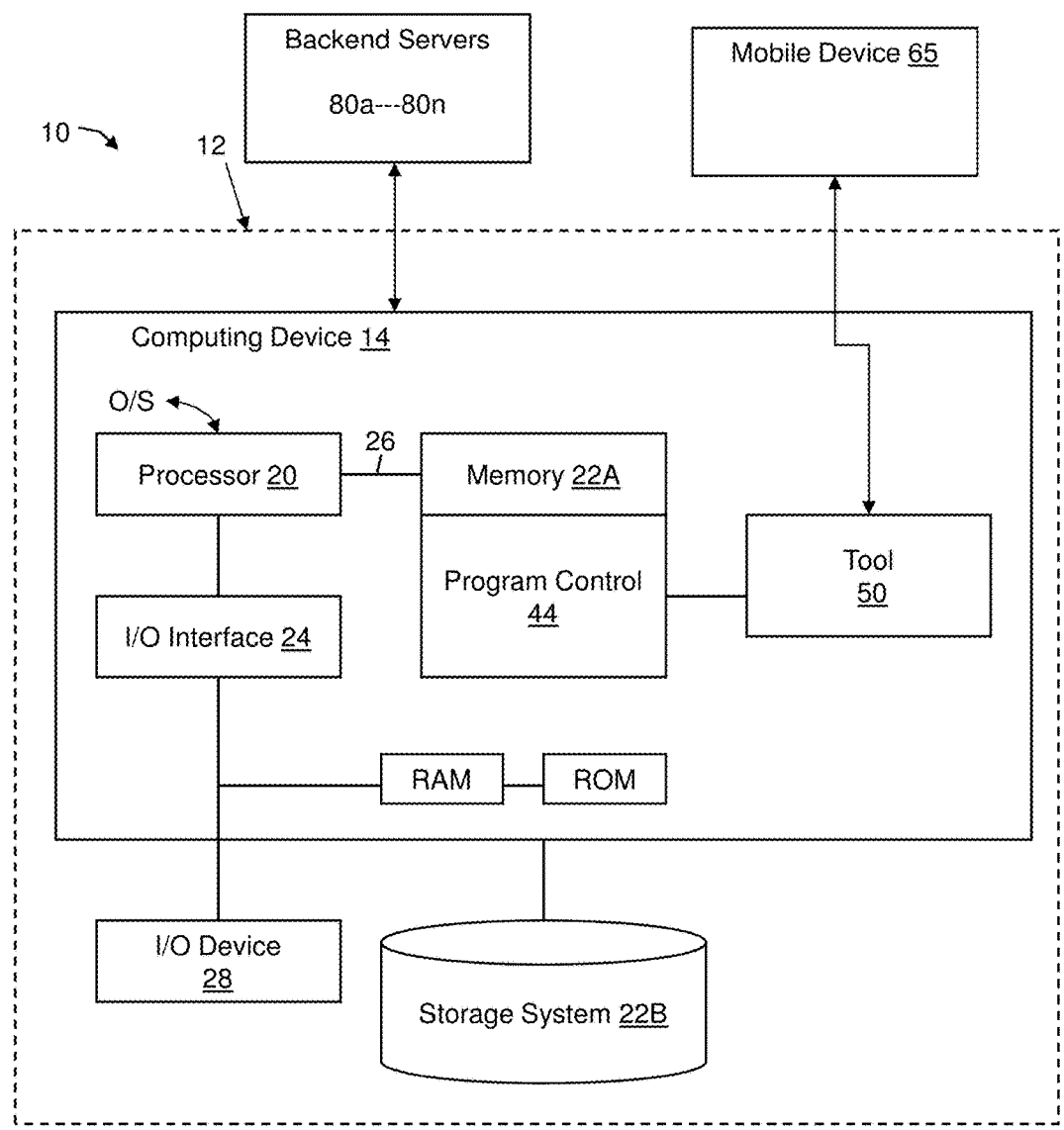
FIG. 1 shows an illustrative environment for managing the processes in accordance with the invention.

The invention relates to identity management for exposing backend services to mobile devices and, more particularly, to systems and processes of advanced identity management over multiple identity providers deployable through mobile applications. In embodiments, the systems and processes described herein can be implemented with, at least, Mobile Backend as a Service (MBaaS) services and application foundation services, using identity management (IDM) platforms that integrate internal and external identity providers without having to rely on the developer to map the service and the corresponding tokens and identities back to the service.

In embodiments, the systems and processes described herein provide identity management to backend services using, e.g., identity management and authentication services, ensuring the backend services are not exposed to or called directly from a device. By way of example, the systems and processes create tokens and provide service templates for call in by a service provider (e.g., gateway server) to multiple backend services. The systems and processes will manage the tokens for different services which includes, e.g., mapping the tokens to the different backend services. By using such systems and processes described herein, devices no longer manage their own tokens or are directly exposed to any backend services; instead, a centralized server, e.g., identity manager and/or gateway server, will manage the services for exposing and calling the backend services. That is, token-based authentication will now be provided through the centralized server, e.g., gateway server, in order to expose and call backend services. In this way, the systems and processes described herein provide authentication and authorization models which effectively extend to encompass mobile devices, in addition to wearable devices and other connected entities including sensors for a variety of different uses.

Advantageously, the systems and processes described herein provide the following unique features.

1. The systems and processes provide a configuration over customization approach for managing identities across multiple providers by creating templates that match what identity parameters a service needs to the service provider. This can be accomplished using a service template that allows the developer to use a single token for identity management and abstracts the identity management from the developer.

2. The systems and processes remove the need for a developer or an application to manage tokens in a transaction for multiple backend services.

3. The systems and processes eliminate the needs for the developer to leverage a single token in order to retrieve remaining tokens to map to a backend service in call, in a fashion standard to MBaaS solutions.

4. The systems and processes allow a change to identity parameters to be quickly changed and applied to multiple service calls.

5. The systems and processes reduce the payload size from mobile device to backend services.

6. The systems and processes increase the security by storing and managing long lived backend tokens on the server side.

7. The systems and processes allow for wearables and other devices to be part of the authentication and authorization chain.

8. The systems and processes allow for offline storage of tokens on all types of peripheral devices to allow for offline authentication in the absence of a network.

9. The systems and processes allow the lifecycle of the token including refreshing of tokens to be managed at the backend, thus reducing the burden on the application developer.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in the medium. The computer-usable or computer-readable medium is not a transitory signal per se, and is any tangible medium that can contain and store the program for use by or in connection with an instruction execution system, apparatus, or device.

FIG. 1 shows an illustrative environment 10 for managing the processes in accordance with the invention. The environment 10 includes a server 12 or other computing system. The server 12 can be representative of an identity server, e.g., identification manager, and/or an authentication or gateway server, each of which can store data in a storage system 22B. In embodiments, the identity server, e.g., identification manager, and/or an authentication or gateway server, may be a separate or same computing device as described with respect to FIG. 3.

In embodiments, the server 12 exposes the backend services 80a-80n to the mobile device(s) 65. That is, the one or more devices 65 communicate directly with the server 12, with the server 12 exposing the backend services 80a-80n to the one or more devices 65. As used herein, a mobile device 65 refers to a smartphone, tablet computer, personal digital assistant, wearable device, sensors for many different uses, as already described herein, or similar computing devices that include, for example, an operating system, wireless communication antenna, processor, user interface, memory, etc.

In embodiments, the server 12 can be a standalone server, which implements the processes of the present invention within a networking environment. The server 12 can be an identity manager and/or authorization server, which includes a computing device 14 which can be resident on a network infrastructure or computing device. The computing device 14 includes a processor 20 (e.g., a CPU), a memory 22A, an I/O interface 24, and a bus 26. The bus 26 provides a communications link between each of the components in the computing device 14. In addition, the computing device 14 includes a random access memory (RAM), a read-only memory (ROM), and an operating system (O/S). The computing device 14 is in communication with the external I/O device/resource 28 and a storage system 22B. The I/O device 28 can comprise any device that enables an individual to interact with the computing device 14 (e.g., user interface) or any device that enables the computing device 14 to communicate with one or more other computing devices (e.g., devices 65, etc.) using any type of communications link.

The processor 20 executes computer program code (e.g., program control 44), which can be stored in the memory 22A and/or storage system 22B. In embodiments, the program control 44 of the computing device 14 of the server 12 controls an identity service tool 50, which comprises program code that is adapted to perform one or more of the processes described herein. The identity service tool 50 can be implemented as one or more program code in the program control 44 stored in memory 22A as separate or combined modules. Additionally, the identity service tool 50 may be implemented as separate dedicated processors or a single or several processors to provide the functions described herein. While executing the computer program code, the processor 20 can read and/or write data to/from memory 22A, storage system 22B, and/or I/O interface 24. In this manner, the program code executes the processes of the invention.

The program code can include computer program instructions that are stored in a computer readable storage medium. The computer program instructions may also be loaded onto a computer, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable storage medium.

The computer readable storage medium comprises any non-transitory medium per se, for example, such as electronic, magnetic, optical, electromagnetic, infrared, and/or semiconductor system. More specific examples (a non-exhaustive list) of the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

According to aspects of the invention, the identity service tool 50 will call and then expose the backend services 80a-80n, which are then provided to the one or more devices 65 through the server 12. In more specific embodiments, the server 12 can be a gateway server with a secure authentication gateway for calling the backend services 80a-80n, authentication the device to the services and exposing the services of the backend services 80a-80n, ultimately provided to the mobile devices 65. By way of specific example, the identity service tool 50 will manage the identity of the one or more devices 65 through the use of tokens and/or credentials which are stored in a database or file, e.g., storage system 22B, rather than as operating system users. The identity service tool 50 can also manage service templates which match what identity parameters a service needs to the service provider, e.g., backend services, as described herein further. To authenticate a request, a token is obtained from the identity service tool 50, which will be mapped to and hence recognized by certain backend services 80a-80n. In this way, the requested services from the backend services 80a-80n will be called and authenticated through the server 12 and exposed to the one or more devices 65 through the server 12.

In addition to managing the identities, e.g., tokens and credentials of the one or more devices 65, the identity service tool 50 and more globally the server 12 will act as a gateway to the backend services 80a-80n such that the backend services 80a-80n are not exposed directly to any of the one or more devices 65. In this way, an added layer of security is provided between the one or more devices 65 and any of the backend services 80a-80n. In fact, by implementing the processes and systems herein, denial of service attacks can be prevented since the backend services 80a-80n are not directly exposed to any device 65. Also, increased security is provided by storing and managing long lived backend tokens on the server side 12, as well as providing offline storage of tokens on all types of peripheral devices to allow for offline authentication in the absence of a network.

In further embodiments, the identity service tool 50 manages identities across multiple providers (e.g., backend services) by creating service templates that match what identity parameters a service needs to the service provider, e.g., backend services. That is, by using service templates, the developer can use a single token for identity management and can abstract the identity management from the developer. Also, such identity management eliminates the need for a developer or an application to manage tokens in a transaction for multiple backend services, as it is now performed by the identity service tool 50. Moreover, as multiple tokens/credentials can be managed for different backend services 80a-80n and devices 65, a developer no longer needs to leverage a single token in order to retrieve remaining tokens to map to a backend service 80a-80n as in standard MBaaS solutions. In addition, as the backend services 80a-80n are now exposed directly from the server, e.g., gateway server, the payload size from device 65 to the backend services 80a-80n is significantly reduced.

In additional embodiments, the identity service tool 50 and more globally the server 12 will act as a centralized, secure gateway to the backend services 80a-80n, while managing the identity of the one or more mobile devices 65 and the related tokens and credentials, etc. By having such a centralized management tool, the developer no longer needs to be responsible to understand how all the tokens map back to a service. Because of this advantage, there is no longer any need for the user to keep up with all the tokens for each provider (e.g., backend service), even subset of tokens no longer need to be managed or mapped by the developer from an identity provider to the service properly using code. Also, the developer no longer will need to code the identity mapping into each service call, which would otherwise require the user to understand which identities themselves map to which service. Now, if a service or ID changes, the identity service tool 50 will map all of the services without the need for any coding with respective identities.

Figure 2:
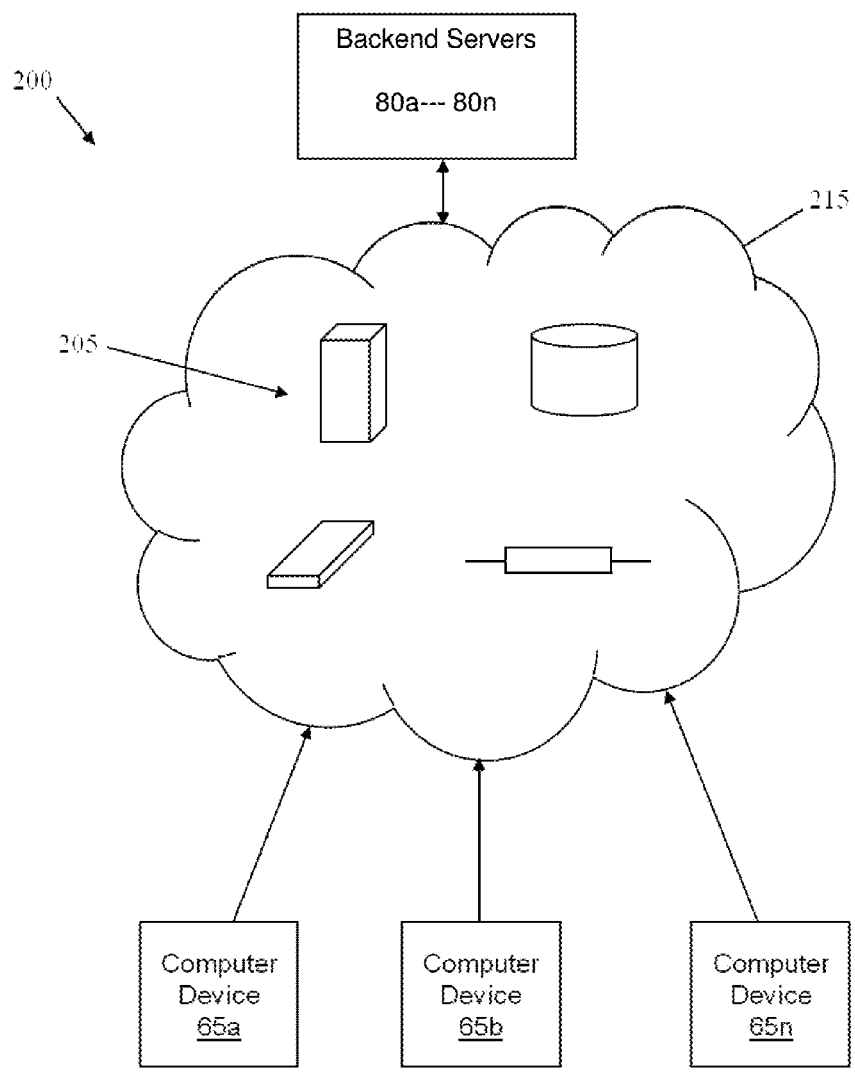
FIG. 2 shows an exemplary cloud computing environment in accordance with aspects of the invention.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with a service provider. In embodiments, one or more aspects, functions and/or processes described herein may be performed and/or provided via cloud computing environment 200.

As depicted in FIG. 2, cloud computing environment 200 includes cloud resources 205 that are made available to client devices 65a . . . n and backend services (servers) 80a-80n via a network 215, such as the Internet. In embodiments, using the cloud, the client devices 65a . . . n can access the different backend systems 80a-80n through an the identity service tool, e.g., server or servers which host the identity service tool, within the cloud computing environment 200 and more specifically as one of the cloud resources 205. By using the cloud resources 205, e.g., the identity service tool, a configuration over customization approach is provided for managing identities across multiple providers by creating service templates that match what identity parameters a service needs to the service provider using a service template that allows the developer to use a single token for identity management and abstracts the identity management from the developer. The use of the system configuration, e.g., cloud resources and more specifically the identity manager, also allows a change to identity parameters to be quickly changed and applied to multiple service calls using service templates, a token manager and a mapping function.

Cloud resources 205 can include a variety of hardware and/or software computing resources, such as servers, databases, storage, networks, applications, and platforms as shown, for example, in FIG. 1. Cloud resources 205 may be on a single network or a distributed network across multiple cloud computing systems and/or individual network enabled computing devices. Cloud resources 205 are typically provided and maintained by a service provider so that a client does not need to maintain resources on a local client device 65a . . . n. In embodiments, cloud resources 205 may include one or more computing system 14 and/or server 12 of FIG. 1 that is specifically adapted to perform one or more of the functions and/or processes described herein. For example, the cloud resources 205 include one or more servers which host the identity service tool.

Cloud computing environment 200 may be configured such that cloud resources 205 provide computing resources to client devices 65a . . . n through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 65a . . . n. For example, cloud resources 205 can provide both SaaS and IaaS to a client device 65a . . . n. Cloud computing environment 200 may be configured such that cloud resources 205 provide computing resources to client devices 65a . . . n through a variety of deployment models, such as any combination of public, private, community, hybrid, and/or any other cloud deployment model.

One or more cloud resources 205 may be structured in multiple layers or functional abstraction layers, e.g., a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

Architecture

Figure 3:
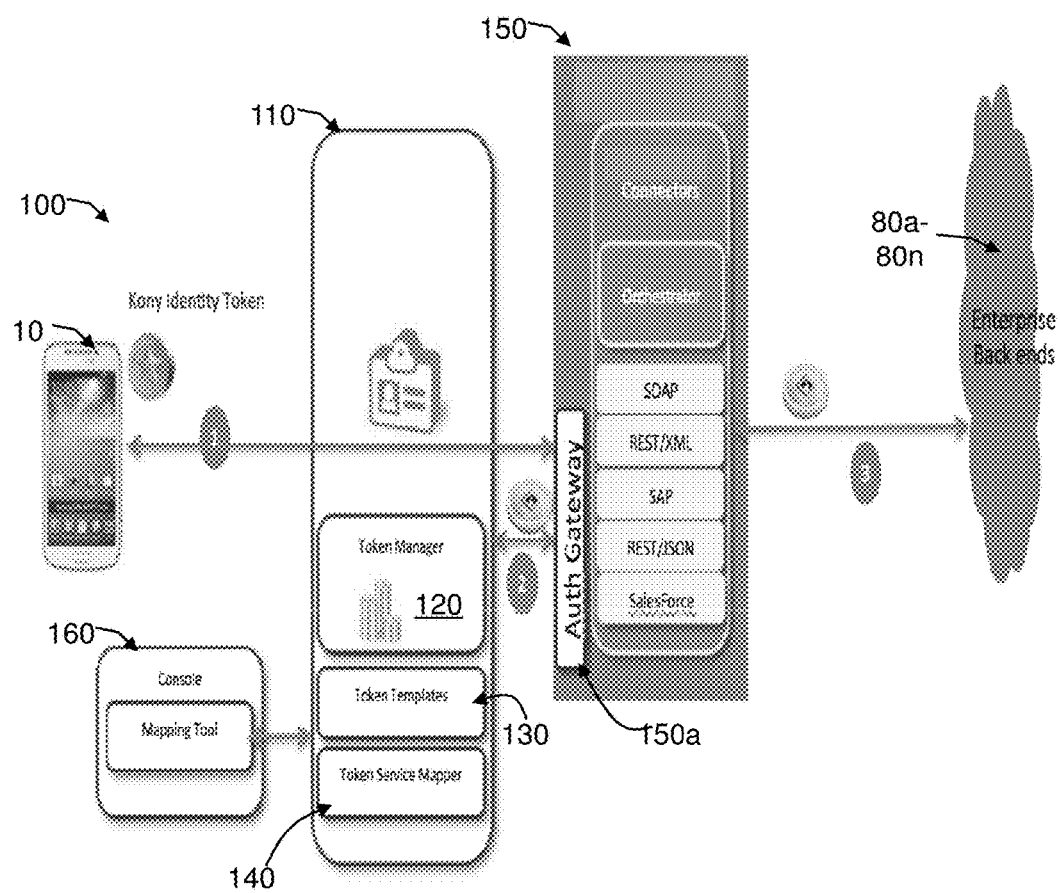
FIG. 3 shows an illustrative architecture for managing the processes in accordance with the invention.

FIG. 3 shows an illustrative architecture for managing the processes in accordance with the invention. In embodiments, the architecture 100 includes an identity server 110, gateway server 150 and a console 160. In embodiments, the identity server 110 can host the identity service tool 50 described with respect to FIGS. 1 and 2, which can include a token manager 120, token templates 130 (also referred to as service templates) and a token service mapper 140 as described herein. The identity server 110 and the gateway server 150 can also be representative of separate servers 12 of FIG. 1 or the cloud resources 205 of FIG. 2. Although the identity server 110 and the gateway server 150 are shown as two services with a separate console 160, one of skill in the art would recognize that these components can be combined into a single service (server) without departing from the spirit and scope of the invention, e.g., server 12 within or outside of the cloud environment shown in FIG. 2.

As described herein, the backend services 80a-80n will be exposed through the gateway server 150, in order for the devices 65 to access the services of the backend services 80a-80n, as described herein. In embodiments, this exposure can be accomplished using the token manager 120, token templates 130 and token service mapper 140, in combination with the authentication gateway 150a of the gateway sever 150.

Specifically, the token manager 120 manages the tokens (credentials) of the one or more mobile devices 65, which are used to authenticate and hence expose the external backend services 80a-80n. In embodiments, the tokens can be stored in a credentials vault of the token manager 120, which is accessible by the gateway server 150 to facilitate a call in to the backend services 80a-80n (via the authentication gateway 150a of the gateway sever 150). The tokens, as described further herein, can be accessed by a key, which is a cryptographic hashing of a username and password, for example. By storing the tokens in a single credentials vault and managing the tokens with the token manager 120, the developer no longer will need to keep track of what services match which identity as well as how the identity maps to any particular service. This, in turn, eliminates complex identity management problems which currently exist.

The token templates 130 provide the credentials needed to access certain endpoints, e.g., backend services. For example, token templates 130 provide a tool to manage identities across multiple providers by creating templates that match what identity parameters a service needs, to the service provider (e.g., backend services 80a-80n). That is, the service template (token template) is used to determine which backend identity parameters need to be passed and how they need to be passed to the backend services 80a-80n. In an illustrative example, the token templates 130 provide the necessary credentials, e.g., login and ID information, for exposing certain backend service endpoints using SOAP (Simple Object Access protocol) messages, RST/XML, SAP, REST/JSON (JavaScript Object Notation). By using such service templates, the systems and processes described herein allow the developer to use a single token for identity management. The token service mapper 140 can map the tokens or credentials to the endpoints, e.g., backend services.

Still referring to FIG. 3, during a transaction it is assumed that the device 65 has been authenticated with the identity services (e.g., identity server 110) using an approach similar to an MBaaS IDM server. When the device 65 makes a call to the backend services 80a-80n, it will access first the gateway server 150. The authentication gateway 150a of the gateway server 150 will then make a request to the identity server 110 for the proper tokens for the backend service call. The identity service, i.e., identity server 110, inspects the service that is being called and determines which service template should be used to map the proper backend tokens to the service. In this example, the service template is used to determine which backend identity parameters need to be passed and how they need to be passed to the backend services 80a-80n. For instance, the token may need to be renamed as it is passed from the gateway server 150 to the backend services 80a-80n, which is the responsibility of the service mapper 140. The gateway server 150 then makes the call to the backend service 80a-80n with the proper credentials mapped.

In this example, the developer just passed a single token to the gateway server 150 that retrieves the proper credentials using the gateway server 150. Templates are mapped from the identity service 120 to the backend service 80a-80n using a console 160. The console 160 also allows the administrator to select which template to use for a service. This allows the developer to focus on coding to a single specification. If the parameters for identity change on the backend services 80a-80n, the administrator simply changes the identity template or changes which identity template a service uses, and does any required configuration in the backend removing the coding from the developer altogether.

Flow Diagrams

Figure 4:
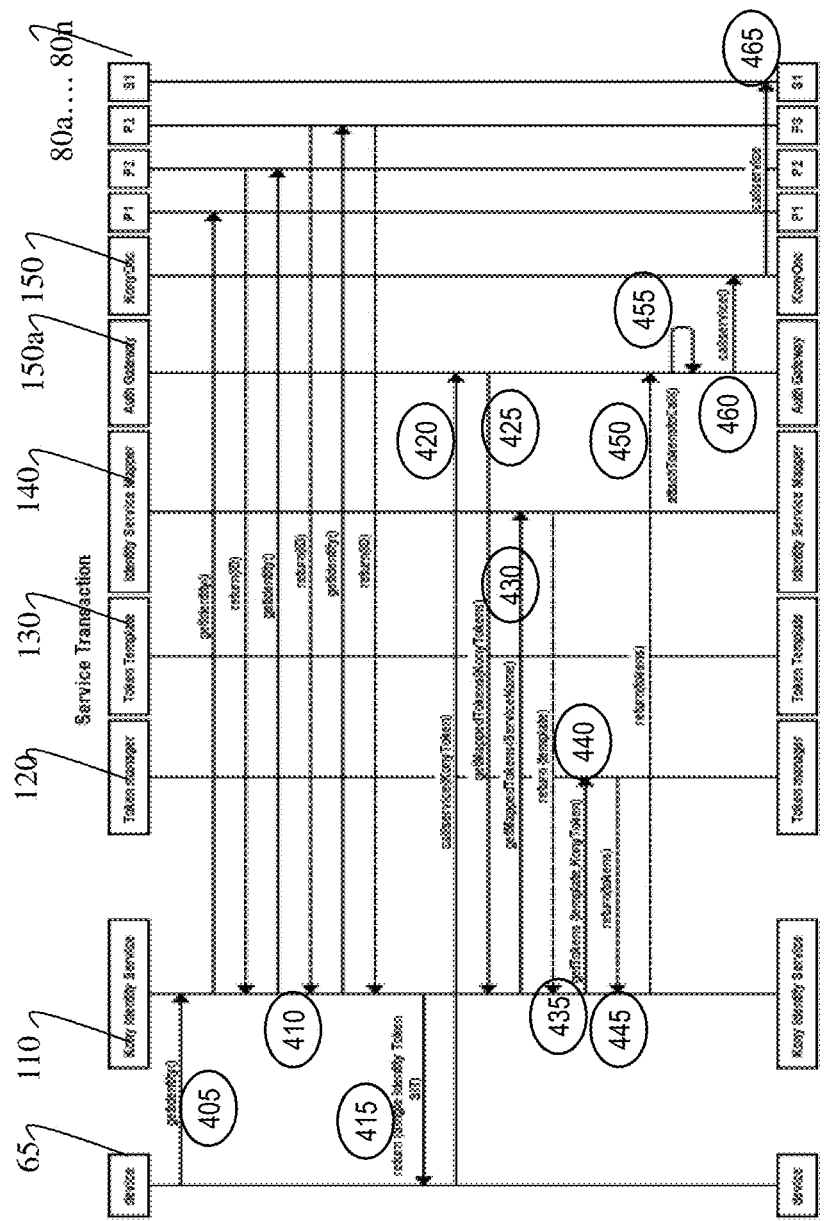
FIGS. 4 and 5 show flow diagrams of methods in accordance with aspects of the invention.
Figure 5:
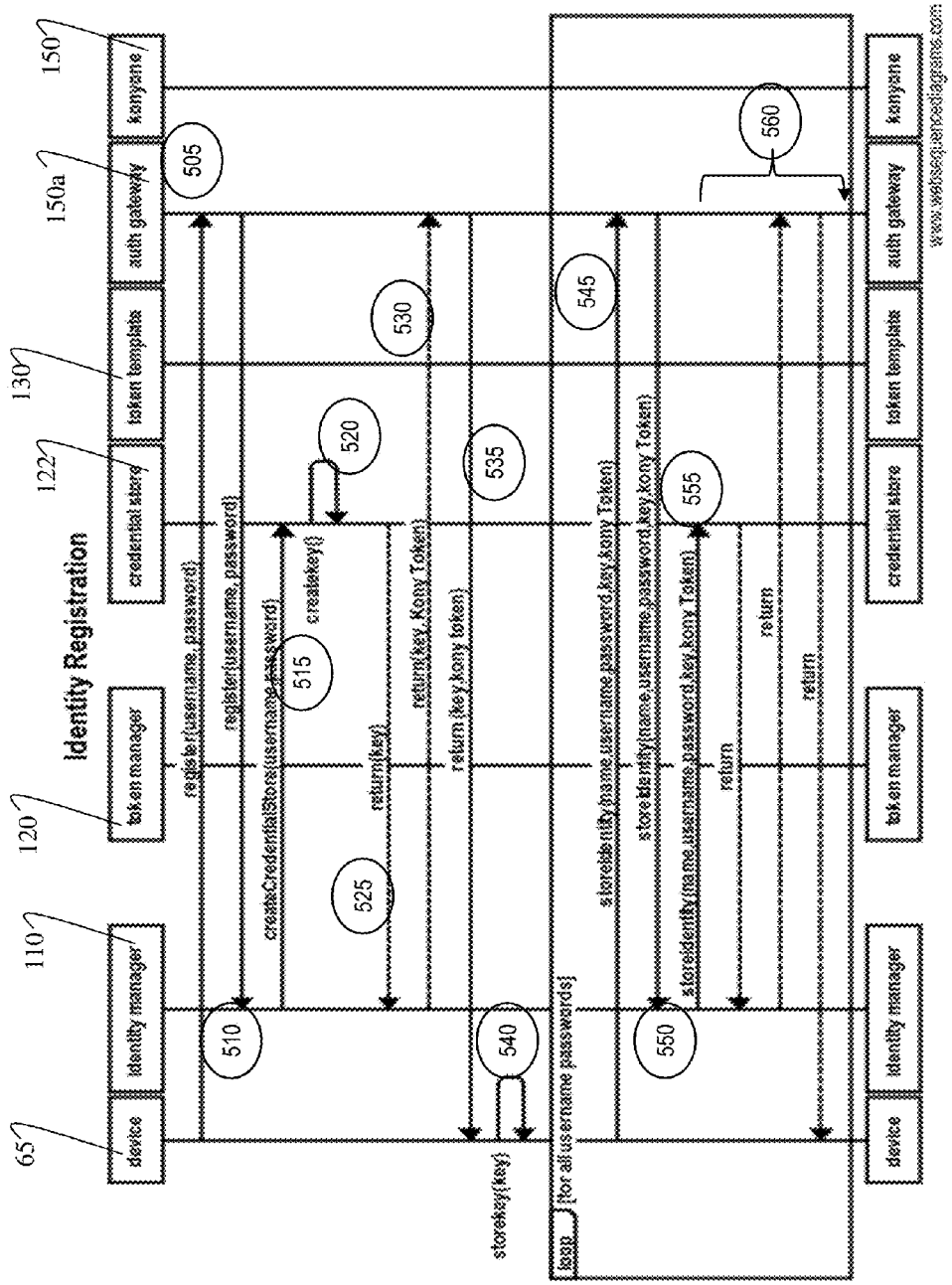

FIGS. 4-5 show swim lane diagrams implementing aspects of the invention. The swim lane diagrams may equally represent a high-level block diagram or a flow diagram of the invention. The steps of the swim lane diagrams may be implemented and executed, for example, from either a server, in a client-server relationship, or they may run on a user workstation with operative information conveyed to the user workstation. Furthermore, steps of the processes of the invention may be implemented using a computer-readable storage medium having program code for use by or in connection with a computer or any instruction execution system. The software and/or computer program product can be implemented in the environments of FIGS. 1-3.

FIG. 4 shows a swim lane diagram of a service transaction in accordance with aspects of the invention. In the implementation of FIG. 4, the following players are shown: device 65, identity services 110, token manager 120, token template 130, identity service mapper 140, authorization gateway 150a, gateway server 150 and backend services 80a-80n. It should be understood by those of skill in the art that the authorization gateway 150a and gateway server 150 can be provided on a single server. Similarly, the token manager 120, token template 130 and identity service mapper 140 can be provided on a single server, e.g., identity services 110.

In more specific embodiments, the swim lane diagram of FIG. 4 shows how a device will obtain a token during the authentication process, while the developer will only concern themselves with the single token on a service call. In embodiments, the identity manager, e.g., identity services 110, will take care of mapping the proper tokens from the identity providers to the proper parameters in the service call that is performed by the gateway server. In embodiments, the identity services 110 include a credentials vault or store that allows a person (device 65) the ability to store a crypographic hash of a password and username that can be used in conjunction with a valid identity token to leverage passwords for non-authorized legacy systems that the user may be required to login to retrieve data or leverage services.

During the first use of the application, the user has the option to maintain a single sign on process. The user then creates a password that is cryptographically hashed and stored on the device 65. When the user logs into the identity services 110 for the first time, the identity services (e.g., token manager) will keep all the username and passwords for the corresponding services within the credential vault that is associated with the user. This allows the identity services 110 the ability to retrieve credentials and login on behalf of the user, even when legacy systems are leveraged. On future logins, the identity services 110 may request a token and cryptographic hash in a validation transaction to open the credential vault. Once the vault is opened and the credentials/tokens are obtained, the gateway server 150 can login to the service on behalf of the user. This is ideal for a single sign on approach for legacy systems, and also allows the template to store how a token for a predetermined time period, e.g., how long a token is good for. If an identity token for a backend service expires, the identity services can use the credentials on behalf of the end user to obtain a new token. This allows the identity administrator to set internal timeouts for services.

More specifically, in the example of FIG. 4, at step 405, a device 65 logs into the identity services 110. Then, at step 410, the identity services 110 will obtain identity information from each of the backend services 80a-80n. In this step, each of the backend services 80a-80n will provide an identity for the device 65, which is then stored in the identity services 110. At step 415, the identity services 110 will provide a single token to the device 65. At step 420, the device 65 will call services of the identity services 110 through the server 150 and more particularly through the authorization gateway 150a, using the token. At step 425, the server 150, through the authorization gateway 150a, will call the services of the identity services 110. At step 430, the identity services 110 will map the tokens with the identity service mapper 140, which is returned to the identity services 110 at step 435. At step 440, the identity services 110 will then obtain the necessary template from the template manager 120 for the requested services. At step 445, the template is then returned to the identity services 110, which is then passed to the server 150 using the authorization gateway 150a, at step 450. The token is then attached to a service call at step 455. The backend services 80a-80n are then called at steps 460 and 465, which are then exposed to the server 150 using the tokens. The services can then be provided to the device 65, through the authorization gateway 150a.

FIG. 5 shows a swim lane diagram of a registration process in accordance with aspects of the invention. In the implementation shown in FIG. 5, the following players are shown: device 65, identity services 110, token manager 120, token template 130, a credentials store 122, authorization gateway 150a, and gateway server 150. As already noted herein, the authorization gateway 150a and gateway server 150 can be provided on a single server. Similarly, token manager 120, token template 130, and credential store 122 can be provided on a single server, e.g., identity services 110.

In FIG. 5, the user enters in all their usernames and passwords for systems on the device during the registration process. The device calls the identity management platform (e.g., identity services 110) to create an identity vault using a username and password supplied by the user. The system creates a credential vault and associates it to the user as well as creating a cryptographic hash of the username and password submitted during initial registration as a key to the vault. This key is sent back to the device 65 which uses the key and a valid identity token on future access to the vault to update, delete or create new credentials for the vault. If a credential becomes invalid, the identity manager (identity services 110) can send a request to the application on the device for the end user to update a specific credential. The user would then send the updated username and password along with the name of the credential to update and the new username and password.

The identity manager (e.g., identify services) can create credential names that the user needs to provide credentials for, and the service template can map a credential in the vault by name to a service. The administrator never sees the password or username of the end user (shielded from an administrator). The service template can also establish a master backend. This backend will be the single point where the user authenticates on first load of the application. Once authenticated to the backend, e.g., gateway server, the identity manager can send an identity token back to the device. To open the remaining back end services, the device then sends the token plus the stored key back to the identity manager whenever the manager needs to establish an identity for a back end service. Once the credential vault is open, the identity administrator can set a timeout for how long the identity manager can access credentials within the vault without asking for a revalidation request from the device which would respond with the key and the token.

The identity manager (e.g., identify services) provides an error handling workflow that allows the identity administrator to determine a course of action if a service fails to authenticate. These options include but are not limited to the following.

(i) Sending a rejection response to the device indicating which service needs to be authenticated against. When the user responds, the identity manager has the option to implicitly update the credential store if the request succeeds.

(ii) The identity manager can make a request to another identity service which is chosen as an option in the token template. This may require mapping items from the original request to new parameters on the second identity request.

(iii) The solution may attempt to return data to only the services that authenticated while sending a failure on the remaining service.

More specifically, at step 505, a device 65 registers with the server 150 through the authorization gateway 150*a*. In this step, the device 65 provides a username and password, for example, to the server 150. At step 510, the server 150 acknowledges registration. At step 515, the device 65 requests a key to be created by the credential store 122. At step 520, the credential store 122 creates the key, and returns the key to the identity services 110 at step 525. In embodiments, the key (to a vault) is creating using a cryptographic hash of the username and password submitted during initial registration.

At step 530, the identity services 120 returns the key and the token to the server 150, via the gateway authorization 150*a*. The key and token is then returned to the device 65, at step 535. The key can then be stored locally on the device, at step 540. At steps 545 and 550, the identity information is stored at both the server 150 (via the gateway authorization) and the identity services 110, respectively. The identification information can include, e.g., name, username, password, key and token. The information is also stored in the credential store 122 at step 550 (as received from the identity service 110). Steps 545-555 can be performed for all usernames and passwords. At step 560, the solution may attempt to return data to only the services that authenticated.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A method comprising:
   requesting a backend service from multiple backend services by a requesting device;
   exposing the requested backend service through a call in by a gateway service using a token mapped to the requested backend service, without exposing any of the backend services directly to the requesting device; and
   providing, via identity services, a credential vault for a user to store a crypographic hash of a password and username that is used in conjunction with a valid identity token to leverage passwords for non-authorized legacy systems that the user may be required to login to retrieve data or leverage services,
   wherein the gateway service directly calls in and is exposed to the requested backend services using the token and a token template, and
   wherein the identity services comprise an identity management system which manages identities of plural devices through the use of tokens which are recognized by the backend services when passed by the gateway service.

2. The method of claim 1, where the token templates match what identity parameters a service needs to the requested backend services.

3. The method of claim 2, wherein the token templates allow a developer to use a single token for identity management regardless of changes to user ID or services of the multiple backend services.

4. The method of claim 3, wherein a service template manager determines which backend identity parameters need to be passed and how they need to be passed to the backend services.

5. The method of claim 1, wherein the credentials vault is accessible by the gateway service to facilitate a call in to the requested backend service.

6. The method of claim 5, wherein the identity services comprise an identity management system which manages identities of plural devices through the use of tokens which are recognized by the backend services when passed by the gateway service.

7. The method of claim 1, further comprising authenticating the device using an MBaaS IDM service, prior to exposing the requested backend service.

8. The method of claim 1, wherein:
the device calls into the gateway service to expose the requested backend service;
the gateway service obtains the token and a token template from an identity service;
the gateway service calls into the requested backend service to expose the backend service directly to the gateway service; and
the requested backend service is provided to the device from the gateway service.

9. The method of claim 1, wherein the identity service is configured to host an identity service tool to provide the token and a token template to the gateway service and to inspect the backend service that is being called by the device and to determine which service template should be used to map tokens to the requested backend service.

10. The method of claim 1, wherein a single token is passed in order to retrieve proper credentials using the gateway service.

11. A computer program product comprising a computer readable storage medium having program instructions embodied therewith, wherein the computer readable storage medium is not a transitory signal per se, and the program instructions are readable by a computing device to cause the computing device to perform a method comprising:
mapping tokens to parameters in a service call to a requested backend service from multiple backend services;
making the service call to the requested backend service, from a service provider;
exposing the requested backend service only to the service provider;
providing a service of the requested backend service to a device, directly from the the service provider while not exposing the backend service to the device; and
providing identity services which provide a credentials vault for a user to store a crypographic hash of a password and username that is used in conjunction with a valid identity token to leverage passwords for non-authorized legacy systems that the user may be required to login to retrieve data or leverage services,
wherein the identity services request a token and cryptographic hash in a validation transaction to open the credential vault, and
wherein the identity services comprise an identity management system which manages identities of plural devices through the use of tokens which are recognized by the backend services when passed by a gateway service.

12. A computer program product comprising a computer readable storage medium having program instructions embodied therewith, wherein the computer readable storage medium is not a transitory signal per se, and the program instructions are readable by a computing device to cause the computing device to perform a method comprising:
mapping tokens to parameters in a service call to a requested backend service;
making the service call to a requested backend service, from a service provider;
exposing the requested backend service only to the service provider;
providing a service of the requested backend service to a device, directly from the the service provider while not exposing the backend service to the device
obtaining identity information from each of the backend services;
returning a single token to the device;
calling the requested backend service by requesting the service through the service provider;
obtaining the mapped token and a service template from an identity management service; and
calling the requested backend service directly from the service provider with the service template and the mapped token attached to the call.

13. The computer program product of claim 12, wherein the service template is configured to allow a developer to use a single token for identity management regardless of changes to user ID or services of the backend services.

14. The computer program product of claim 12, wherein the service template determines which backend identity parameters need to be passed and how they need to be passed to the backend services.

15. The computer program product of claim 12, further comprising identity services which provide a credential vault for a user to store a crypographic hash of a password and username that is used in conjunction with a valid identity token to leverage passwords for non-authorized legacy systems that the user may be required to login to retrieve data or leverage services.

16. The computer program product of claim 15, wherein the identity services request a token and cryptographic hash in a validation transaction to open the credential vault.

17. The computer program product of claim 16, wherein the identity services use the cryptographic hash to obtain a new token when the valid identity token expires.

* * * * *